US011697600B2

(12) United States Patent
Dreisinger et al.

(10) Patent No.: US 11,697,600 B2
(45) Date of Patent: Jul. 11, 2023

(54) VANADIUM EXTRACTION FROM DISPARATE SHALE ORES (71) Applicant: First Vanadium Corp., Vancouver (CA)

(72) Inventors: David Dreisinger, Vancouver (CA); Jodi Esplin, Vancouver (CA); Mike Johnson, Vancouver (CA); Gary Kordosky, Vancouver (CA); Erin Legault, Vancouver (CA); Michael Mracek, Vancouver (CA); Frederick Sveinson, Vancouver (CA); Sandra Sveinson, Vancouver (CA); Radomir Vukcevic, Vancouver (CA)

(73) Assignee: First Vanadium Corp., Vancouver (CA)

( * ) Notice: Subject to any disclaimer, the term of this patent is extended or adjusted under 35 U.S.C. 154(b) by 346 days.

(21) Appl. No.: 17/152,024

(22) Filed: Jan. 19, 2021

(65) Prior Publication Data
US 2021/0221701 A1   Jul. 22, 2021

Related U.S. Application Data (60) Provisional application No. 62/963,451, filed on Jan. 20, 2020.

(51) Int. Cl.
*C01G 31/02* (2006.01)
(52) U.S. Cl.
CPC .................. *C01G 31/02* (2013.01)

(58) Field of Classification Search
None
See application file for complete search history.

(56) References Cited

FOREIGN PATENT DOCUMENTS

| CN | 101775507 A | 7/2010 |
|---|---|---|
| CN | 103706465 A | 4/2014 |
| CN | 104959212 A | 10/2015 |
| CN | 105032598 A | 11/2015 |
| CN | 108126828 A | 6/2018 |

OTHER PUBLICATIONS

International Search Report and Written Opinion received for PCT Application No. PCT/CA2021/050036, dated Mar. 25, 2021, 11 pages.
Brooks et al. (Jul. 1974) "Recovering Vanadium from Dolomitic Nevada Shale", Bureau of Mines, Washington, D.C., 26 pages.
Zhang et al. (Sep. 2011) "The Technology of Extracting Vanadium from Stone Coal in China: History, Current Status and Future Prospects", Hydrometallurgy, 109(1):116-124.

*Primary Examiner* — Colin W. Slifka
(74) *Attorney, Agent, or Firm* — Mintz, Levin, Cohn, Ferris, Glovsky and Popeo, P.C.

(57) ABSTRACT

The invention provides for the orchestrated treatment of disparate fractions of a shale deposit to recover vanadium values, with distinct steps of beneficiation that together provide a combined vanadium-enriched concentrate amenable to subsequent combined steps of hydrometallurgical vanadium extraction.

21 Claims, 4 Drawing Sheets

VANADIUM EXTRACTION FROM DISPARATE SHALE ORES

CROSS-REFERENCES TO RELATED APPLICATIONS

This application claims the benefit of priority to U.S. Provisional patent Application No. 62/963,451, filed on Jan. 20, 2020, the entire contents of which is herein incorporated by reference.

FIELD

The disclosed innovations are in the field of chemical and physical mineral processing techniques, particularly methods for co-ordinated processing of disparate shale ores to extract vanadium values.

BACKGROUND

A wide variety of approaches have been suggested for the recovery of vanadium values from a wide variety of source materials (see Gupta and Krishnamurthy, 1992). In a variety of settings, vanadium occurs in association with sedimentary deposits, such as weathered dolomitic shales in the United States (Brooks, 1974). Particular challenges are posed in circumstances where vanadium occurs in relatively low concentrations in deposits that are made up of distinct ores.

SUMMARY

Methods are provided for producing a vanadium concentrate, and then recovering vanadium values from, a shale deposit. The methods involve recovering two distinct material fractions, an oxidized material and a carbonaceous material. The oxidized material may be made up of carbonate gangue, vanadiferous mineralization and oxidized vanadate-containing kerogen, the oxidized material for example having: 1 wt % organic carbon; 2 wt % vanadium pentoxide, as an original oxidized vanadium fraction; and 10, 20 or 30 wt % calcium and magnesium carbonates, as an original oxidized carbonates fraction. In contrast, the carbonaceous material may be made up of carbonate gangue and a vanadium-containing kerogen, the carbonaceous material for example having: 4 wt % organic carbon; ≤2 wt % vanadium pentoxide, as an original carbonaceous vanadium fraction; and ≥10, 20 or 30 wt % calcium and magnesium carbonates, as an original carbonaceous carbonates fraction. The oxidized and carbonaceous materials may be subjected to distinct beneficiation processes.

The oxidized material may be subjected to an attrition step, and to a particle size separation step. This may be carried out so as to segregate a vanadium fines stream from a coarser carbonates stream. Process parameters may be adjusted so that the vanadium fines stream is made up of less than about 30% wt % of the original oxidized carbonates fraction, and so that at least about 75% wt % of the original oxidized vanadium fraction reports to the vanadium fines stream.

In contrast to the treatment of the oxidized material, the carbonaceous material may be subjected to a de-sliming step so as to segregate a fine vanadium and carbonate-containing fraction from a coarser vanadium and carbonate-containing fraction. The coarser fraction may be subjected to flotation so as to segregate a vanadium froth concentrate from a carbonate flotation tail, with conditions arranged so that the vanadium froth concentrate includes less than about 30 wt % of the original carbonaceous carbonates fraction, and so that at least 75 wt % of the original carbonaceous vanadium fraction reports to the combination of the vanadium froth concentrate and the fine vanadium and carbonate-containing fraction.

The vanadium froth concentrate and the fine vanadium and carbonate-containing fraction may be combined with the vanadium fines, for example so as to provide a vanadium concentrate having a vanadium concentration of at least 1 wt %. The vanadium concentrate may be subjected to an atmospheric pre-leach (PL) with the addition of an autoclave-sourced sulfuric acid, to produce a pre-leached product stream, for example so as to: decompose residual carbonate minerals in the vanadium concentrate to produce carbon dioxide off-gas; and, precipitate iron species from the vanadium concentrate.

The pre-leached product may be subjected to a PL solid liquid separation to separate a PL solid stream from a vanadium recovery solution. The PL solid stream may be directed to a pressure oxidation (POX) in the presence of a POX leaching acid and a POX oxidizing agent, so as to produce a POX product stream by leaching vanadium into a POX solution that includes the autoclave-sourced sulfuric acid. The POX product stream may in turn be directed to a POX solid liquid separation to separate a solid POX residue from the POX solution. The POX solution may be directed to the atmospheric PL, to provide the autoclave-sourced sulfuric acid to the atmospheric PL.

The vanadium recovery solution may then be subjected to an ion exchange process for removal of low concentrations of uranium and/or molybdenum by a strong base resin in the chloride form. The purified vanadium recovery solution may then be further subjected to a vanadium oxidation step to convert dissolved vanadium species to dissolved vanadium (V) oxoanion species in an oxidized vanadium recovery solution. The oxidized vanadium recovery solution may in turn be subjected to a vanadium solvent extraction (VSX) step to load vanadium species into a pregnant organic phase, and separating the pregnant organic phase from a spent vanadium recovery solution. Vanadium may be stripped from the pregnant organic phase into an aqueous sodium or ammonium vanadate solution, to provide a stripped organic phase that is recycled to the VSX step. Ammonium metavanadate may then be precipitated from the sodium or ammonium vanadate solution by addition of ammonium sulfate. The ammonium metavanadate may in turn be calcined to provide a vanadium pentoxide product.

DETAILED DESCRIPTION

Figure 1:
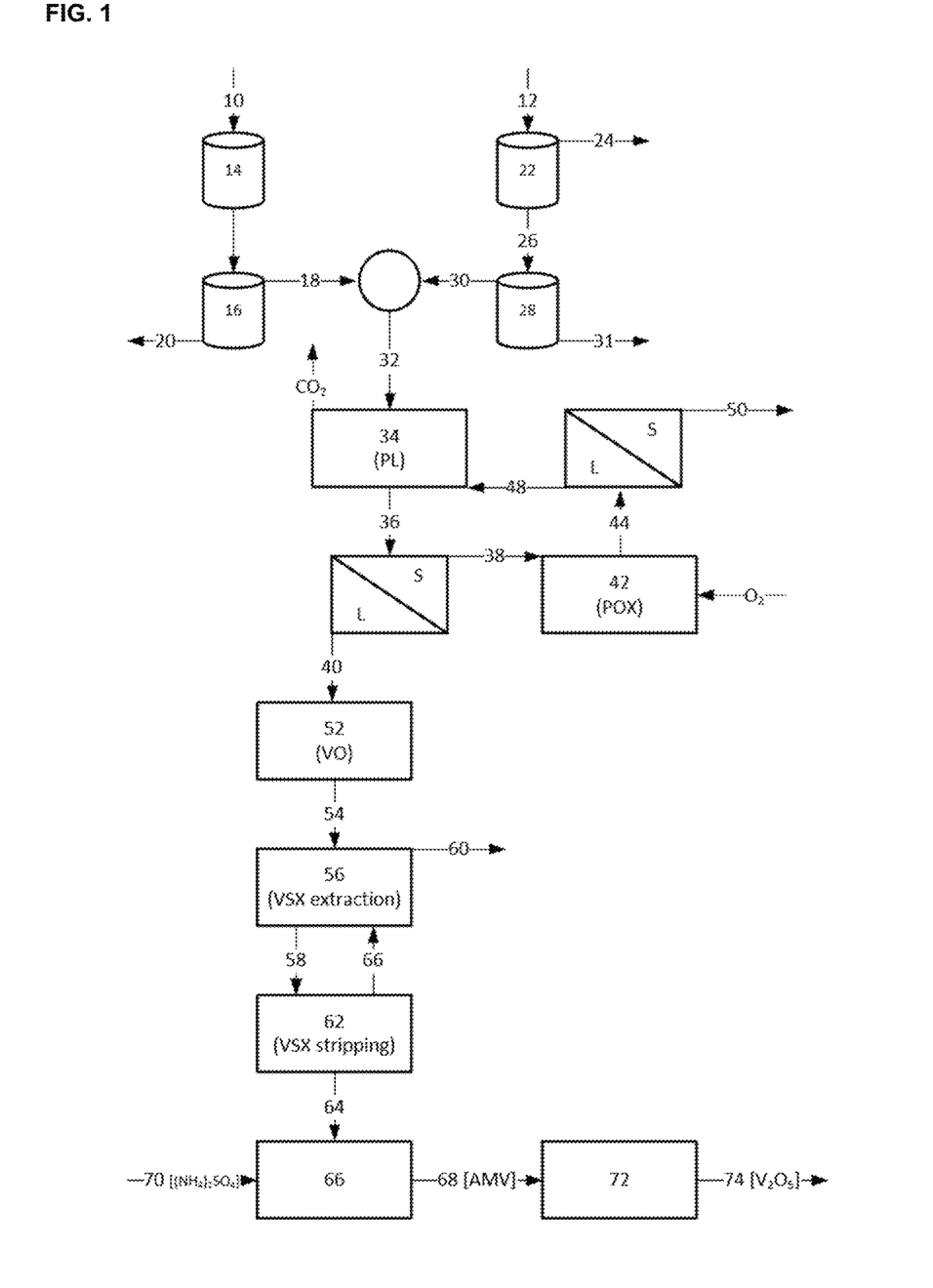
FIG. 1 is a process flow diagram illustrating a process for extracting vanadium values from distinct ore fractions of a shale deposit.

As illustrated in FIG. 1, processes are provided for recovering vanadium values from a shale deposit made up of disparate materials, characterized herein as oxidized and carbonaceous materials. Both materials may comprise significant proportions of carbonate gangue, as for example in dolomitic shales, for example having from 2 to ≥30 wt % $CO_3$, or ≥10, 11, 12, 13, 14, 15, 20, 25 or 30 wt % calcium and/or magnesium carbonates. The oxidized and carbonaceous materials may be further characterized as having CaO values that range from about 6-16%, and/or MgO contents ranging from about 4-10%. The gangue may for example be relatively fine-grained and composed of an intimate mixture of one or more of quartz, feldspar, clay, calcite, and/or dolomitic limestone. The disparate shale materials may also both be relatively low in vanadium concentration, for example having 0.2 to 1.5 wt % vanadium pentoxide, which may for example be present as hydrated calcium vanadate (hewettite or metahewettite), corvusite, montroseite-goethite or pascoite.

The relatively low vanadium concentration, in intimate mixture with host materials, in combination in particular with the relatively high carbonate gangue concentration, poses significant challenges for economic extraction of vanadium values. A further significant challenge is posed by the fact that the materials are otherwise distinct in the nature of the material hosting the vanadium values.

The vanadiferous shale may for example comprise distinct black to brown or gray siltstones or mudstones, for example representing a weathered progression from an oxidized upper material comprising a comparatively reduced amount of organic material, for example 1 wt % organic carbon. The oxidized material may also contain vanadiferous mineralizations, for example vanadiferous goethite, and an oxidized vanadate-containing kerogen (for example being a highly oxidised and patchy kerogen of indeterminate composition with poorly defined and difficult-to-detect vanadates). In the oxidized material, the bulk of the vanadium may for example report as vanadates such as metahewettite, pascoite, or montroseite with goethites that contain both minor structurally bound vanadium and surface coatings of vanadates.

In carbonaceous or reduced material, in contrast to the oxidized material, vanadium may for example be found primarily in association with S-bearing kerogen, with kerogen acting as the primary host for vanadium in carbonaceous material, for example from 4, or from 4 to 13 wt % organic carbon.

Referring to FIG. 1, processes are accordingly provided for recovering as a distinct fraction an oxidized material 10 from the shale deposit, the oxidized material comprising carbonate gangue, vanadiferous mineralizations, such as goethite, and an oxidized vanadate-containing kerogen. The oxidized material may for example be characterized as comprising one or more of: ≤1 wt % organic carbon; ≤2 or from 0.2 to 1.5% wt % vanadium pentoxide; and/or, ≥10, 11, 12, 13, 14, 15, 20, 25 or 30 wt % calcium and/or magnesium carbonates.

Similarly, the present process may include recovery of a carbonaceous material 12 from the shale deposit, with the carbonaceous material comprising carbonate gangue and a vanadium-containing kerogen. The carbonaceous material may for example be characterized as comprising: 4 to 13 wt % organic carbon; ≤2 or from 0.2 to 1.5 wt % vanadium pentoxide; and/or, ≥10, 11, 12, 13, 14, 15, 20, 25 or 30 wt % calcium and/or magnesium carbonates.

The oxidized material 10 may be subjected to an attrition step 14, and then to a particle size separation step 16, so as to segregate a vanadium fines stream 18 from a coarser carbonates stream 20. The vanadium fines stream may for example be characterized as comprising less than about 5 to 15 wt % carbonates. In select embodiments, at least 75-90% of the vanadium pentoxide in the oxidized material reports to the vanadium fines stream.

The oxidized material 10 may for example be treated by crushing, wet grinding and attritioning 14. Attritioning 14 may be carried out so as to remove fine vanadium-containing mineral particles from coarser carbonate-containing mineral particles. An attritioning slurry may for example be subjected to a cycloning or centrifuge process which separates the fine, vanadium-containing stream 18 away from the coarser, carbonate-containing stream 20. The fine material 18 enriched in vanadium may for example be concentrated before being directed to leaching processes, and the carbonate containing stream 20 may be diverted to tails (or may be used as a source of alkali to neutralize acids in alternative aspects of the process).

The carbonaceous material 12 may be subjected to a parallel de-sliming process 22, so as to segregate a fine vanadium and carbonate-containing fraction 24 from a coarser vanadium and carbonate-containing fraction 26. The coarser vanadium and carbonate-containing fraction 26 may then be subject to a flotation process 28, so as to segregate a vanadium froth concentrate 30 from a carbonate flotation tail 31. The vanadium froth concentrate 30 may for example comprise less than about 10-15 wt % carbonates. In select embodiments, at least 75% of the vanadium pentoxide in the carbonaceous material reports to the combination of the vanadium froth concentrate 30 and the fine vanadium and carbonate-containing fraction.

The carbonaceous (or reduced) material 12 may for example be treated by crushing, wet grinding, cycloning or centrifuging (optional) and mineral flotation 28. The crushing and wet grinding may be carried out so as to provide for mineral breakage and liberation. Cycloning or centrifuging may be carried out so as to remove the fine vanadium and carbonate-containing material 24 from the ground coarser vanadium and carbonate-containing slurry (in a de-sliming process), with the fines 24 reporting as a cyclone overflow. The residual coarser cycloned or centrifuged solids 26 are subjected to mineral flotation 28 to recover the vanadium froth concentrate 30. The flotation chemicals used may for example be a hydrocarbon liquid, such as a diesel, as a collector, and a suitable frother such as MIBC (methyl isobutyl carbinol or 4-Methyl-2-pentanol, IUPAC name: 4-methylpentan-2-ol). MIBC absorbs at the water-air interface, aids in the production of bubbles, and stabilizes the flotation froths. The coarser solids 26 may be conditioned, for example with diesel, for example in a high density/high intensity conditioning step, to facilitate intimate admixture of the flotation mixture, and then subjected to flotation 28 to produce the vanadium concentrate 30 depleted in carbonate content (thereby minimizing acid consumption in subsequent leaching processes).

The beneficiation of both the oxidized and carbonaceous materials produces materials that are enriched in vanadium and depleted in carbonate. As a result, the vanadium froth concentrate 30 may be combined with the fine vanadium and carbonate-containing fraction and with the vanadium fines 18, to provide a vanadium concentrate 32 amenable to subsequent hydrometallurgical steps of vanadium extraction. The vanadium concentrate may for example have a vanadium concentration of at least 1 wt % vanadium pentoxide.

The vanadium concentrate 32 may be subjected to an atmospheric pre-leach (PL) 34 process, for example with the addition of an autoclave-sourced sulfuric acid, to produce a pre-leached product stream 36. This PL process may for example be carried out so as to: decompose residual carbonate minerals in the vanadium concentrate 32 to produce carbon dioxide off-gas; and/or, precipitate iron species from the vanadium concentrate. The PL process 34 accordingly allows decomposition of the carbonates in the concentrate 32 using an acid from a pressure oxidation process 42. In some embodiments, an additional base may be added to the PL in order to close the acid balance, this may be useful where there is an excess of acid, although in typical implementations there will be an excess of residual basic material in the concentrate so that the acid from the autoclave will be fully neutralized. The pre-leach process 34 may for example involve the supplemental addition of acid and air or oxygen, so as to oxidize iron salts to the +3 oxidation state. In some embodiments, reactions in the pre-leach may include:

Acid decomposition of carbonate minerals:

$$CaCO_3 + H_2SO_4 + H_2O = CaSO_4 \cdot 2H_2O + CO_2(g);$$

$$MgCO_3 + H_2SO_4 = MgSO_4 + H_2O + CO_2(g);$$

Reduction of ferric sulfate with pyrite (or other sulfides present):

$$4Fe_2(SO_4)_3 + FeS_2 + 4H_2O = 9FeSO_4 + S + 4H_2SO_4;$$

Air oxidation of ferrous sulfate to form ferric sulfate:

$$4FeSO_4 + O_2 + 2H_2SO_4 = 2Fe_2(SO_4)_3 + 2H_2O;$$

Ferric sulfate hydrolysis to form ferric hydroxide and remove iron from the vanadium leachate:

$$Fe_2(SO_4)_3 + 9H_2O = 2Fe(OH)_3 + 6H_2SO_4;$$

Reduction of vanadium sulfate with pyrite (or other sulfides present):

$$4(VO_2)_2SO_4 + 4H_2SO_4 + FeS_2 + = 8VOSO_4 + S + FeSO_4 + 4H_2O; \text{ and,}$$

Partial precipitation of vanadium with ferric sulfate to form ferric vanadate solids (these will be recovered again in the subsequent POX:

$$(VO_2)_2SO_4 + Fe_2(SO_4)_3 + 4H_2O = 2FeVO_4 + 4H_2SO_4.$$

The pre-leach 34 may accordingly be carried out so as to: decompose carbonates, to reduce the concentration of carbonates that report to POX 42 (to minimize the venting of carbon dioxide from the sealed POX autoclave—with consequent loss of heat and oxygen); and, to produce a low-iron containing vanadium solution for vanadium recovery.

The pre-leached slurry product 36 (after completion) may be subjected to a PL solid liquid separation (e.g. a thickener or a filter) to separate a PL solid stream 38 from a vanadium recovery solution 40. The PL solid stream 38 may then be directed, for example as a wet slurry, to a pressure oxidation (POX) 42 process in the presence of a POX leaching acid and a POX oxidizing agent, to produce a POX product stream 44 by leaching vanadium into a POX solution 48 in the presence of acid, oxygen and at a raised temperature. Typical temperatures are for example in the range of about 110° C.-240° C., at oxygen over pressures for example 100-200 psig or of approximately 100 psig (700 kPa), with acid concentrations of 30, 40, 50, 60 or 70 g/L $H_2SO_4$.

The POX product stream 44 may be directed to a POX solid liquid separation, to separate a solid POX residue 50 from the POX solution 48. The POX solution 48 may then be directed to the atmospheric PL 34, to provide the autoclave-sourced sulfuric acid to the atmospheric PL 34. In select embodiments, the reactions involved in POX may include the following:

Acid decomposition of carbonate minerals (for any residual carbonates):

$$CaCO_3 + H_2SO_4 + H_2O = CaSO_4 \cdot 2H_2O + CO_2(g);$$

$$MgCO_3 + H_2SO_4 = MgSO_4 + H_2O + CO_2(g);$$

Pyrite oxidation:

$$2FeS_2 + 7.5O_2 + H_2O = Fe_2(SO_4)_3 + H_2SO_4;$$

Carbon oxidation:

$$C + O_2 = CO_2;$$

Keragen oxidation $$C_xH_yO_z + (x+y/2-z/2)O_2 = xCO_2 + y/2H_2O;$$

Iron oxide dissolution:

$$2FeOOH + 3H_2SO_4 = Fe_2(SO_4)_3 + 4H_2O;$$

Vanadium (+4) extraction:

$$V_2O_2 + H_2SO_4 = VOSO_4 + H_2O;$$

Vanadium (+4) oxidation:

$$4VO_2 + O_2 + 2H_2SO_4 = 2(VO_2)_2SO_4 + 2H_2O;$$

Vanadium (+5) extraction:

$$V_2O_5 + H_2SO_4 = (VO_2)_2SO_4 + H_2O;$$

Ferric Vanadate extraction:

$$2FeVO_4 + 4H_2SO_4 = (VO_2)_2SO_4 + Fe_2(SO_4)_3 + 4H_2O; \text{ and,}$$

Iron precipitation:

$$Fe_2(SO_4)_3 + 3H_2O = Fe_2O_3 + 3H_2SO_4.$$

The POX discharge may for example be flashed to atmospheric temperature and pressure, and the solids 50 separated from the liquid 48. The solids 50 may for example be washed, for example in a series of counter current decantation thickeners with appropriate washing. The products from POX 42 may accordingly be a washed residue 50 to tailings and a strongly acidic solution 48 containing vanadium (+4 and +5) sulfates, iron salts and the autoclave-sourced acid.

The PL product vanadium recovery solution 40 is generally relatively low in acid (pH~2) with some residual iron, vanadium species and may in some embodiments include some minor uranium and molybdenum values. Uranium may for example be removed by strong base ion exchange, for example so as to avoid any transfer of uranium to the vanadium product. In such embodiments, uranium may be eluted with NaCl solution, as follows:

$$UO_2(SO_4)_3^{4-} + 4(-NR_3Cl) = (-NR_3)_4UO_2(SO_4)_3 + 4Cl^-$$

$$(-NR_3)_4UO_2(SO_4)_3 + 4NaCl = UO_2^{2+} + 3SO_4^{2-} + 4(-NR_3Cl) + 4Na^+.$$

The solution after uranium removal may optionally be treated with sulfide to selectively remove molybdenum as a valuable product. This may for example be accomplished with hydrogen sulfide, sodium hydrosulfide or sodium sulfide, with resulting production of a molybdenum sulfide precipitate (which can be filtered, washed and recovered as a by-product), as follows:

$$H_2MoO_4 + 3Na_2S + 3H_2SO_4 = MoS_3 + 4H_2O + 3Na_2SO_4.$$

If molybdenum is optionally not removed from solution at this stage, it will pass with vanadium to vanadium solvent extraction and be co-extracted with vanadium. The precipitation process for vanadium (after solvent extraction) may be arranged so as to be selective for vanadium over molybdenum. This provides an alternative embodiment that may be implemented to minimize molybdenum reporting to the final vanadium product.

The PL product vanadium recovery solution 40, for example after removal of uranium and molybdenum, may be subjected to a vanadium oxidation (VO) process 52, for example with a peroxide at elevated temperatures, or with other oxidants such as $H_2SO_5$ (Caro's acid), $NaS_2O_8$ (sodium persulfate), NaOCl (sodium hypochlorite), chlorine, ozone, $SO_2$/air (including variations other than the sodium salts, such as for example K, Mg or Ca salts). The VO process may accordingly be carried out so as to convert dissolved vanadium species to dissolved vanadium(v) oxoanion species in an oxidized vanadium recovery solution 54, as follows:

$$2VO_2 + H_2O_2 + H_2SO_4 = (VO_2)_2SO_4 + 2H_2O.$$

In some embodiments, there may be some further oxidation and precipitation of iron that occurs during the VO process 52, in accordance with the following reaction, in which case any solids formed may be removed by clarification prior to solvent extraction of vanadium:

$$2FeSO_4 + H_2O_2 + 4H_2O = 2Fe(OH)_3 + 2H_2SO_4.$$

Figure 2:
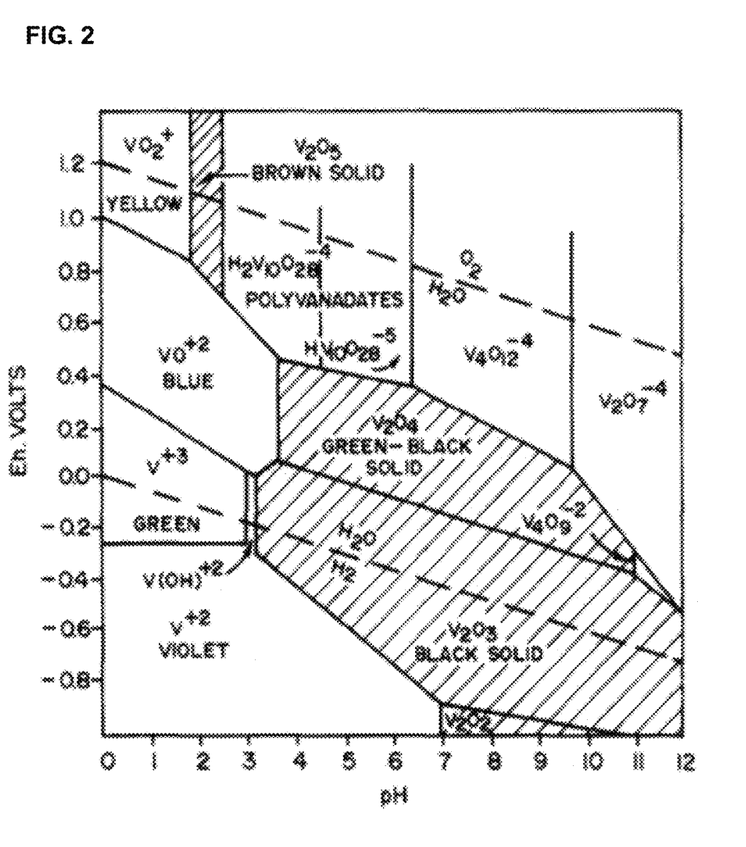
FIG. 2 is a speciation diagram for vanadium species.

In the VO process 52, vanadium species may form a range of polynuclear species, see FIG. 2, while maintaining vanadium in the +5 oxidation state. For example a 10-V polynuclear species as shown below:

$$5(VO_2)_2SO_4 + 8H_2O = (H^+)_4(H_2V_{10}O_{28}^{4-}) + 5H_2SO_4.$$

The oxidized vanadium recovery solution 54 may then be subjected to a vanadium solvent extraction (VSX) 56 process, to load vanadium species into a pregnant organic phase. In select embodiments, a tertiary amine, such as Alamine 336, may be used as the solvent, for example in a suitable diluent such as a kerosene. The tertiary amine, such as Alamine 336, may for example be conditioned with sulfuric acid solution prior to vanadium extraction. Alamine 336 has the formula $(NR_3)$, where the R groups represent hydrocarbon groups of 8 and 10 carbons respectively in about a 60/40 ratio. Representing the conditioned Alamine 336 as $NR_3H^+(HSO_4^-)$ the use of the conditioned Alamine 336 to extract vanadium may be represented as follows:

Loading:

$$4(NR_3H^+(HSO_4^-)) + (H^+)_4(H_2V_{10}O_{28}^{4-}) = (NR_3H^+)_4(H_2V_{10}O_{28}^{4-}) + 4H_2SO_4.$$

In practice, the amine protonation, acid consumption and vanadium extraction reactions are complex. In general terms, vanadium +5 in aqueous solution exists primarily as the $VO_2^+$ cation at low pH and as the $VO_3^-$ anion at high pH. In the pH range 2-6 the main species is the orange decavanadate ion $[V_{10}O_{28}^{-6}]$, which can exist in several protonated forms. These vanadium +5 oxyanions are readily extracted by protonated amines. Maximum loading tests show that on average 3 protonated amines will extract about 9 vanadium atoms, which suggests that the primary anion extracted is $[V_{10}O_{25}(OH)_3]^{3-}$, in a process that may be represented as follow:

$$R_3N + 3H^+ \rightleftharpoons 3R_3NH^+ + [V_{10}O_{25}(OH)_3]^{3-} \rightleftharpoons [(R_3NH^+)_3(V_{10}O_{25}(OH)_3^{3-})].$$

The pregnant loaded organic phase 58 may be washed and/or scrubbed with water or dilute acid or a vanadium +5 salt solution (for example) to remove any entrained aqueous solution or co-extracted impurities (including iron which may be loaded as a separate species or incorporated in the polynuclear vanadium species).

The pregnant organic phase 58 may then be separated from a spent vanadium recovery raffinate 60. In a V-stripping step 62, vanadium may be stripped, for example with sodium carbonate or aqueous ammonia, from the pregnant organic phase 58 into an aqueous sodium or ammonium vanadate solution 64, which may contain sodium sulfate or ammonium sulfate derived from residual bisulfate loading of the solvent extraction chemical (e.g. Alamine 336). The stripping reaction with sodium carbonate solution may accordingly include:

Vanadium Stripping $$(NR_3H^+)_4(H_2V_{10}O_{28}^{4-}) + 5Na_2CO_3 = 2.5Na_4V_4O_{12} + 3H_2O + 5CO_2(g) + 4(NR_3); \text{ and,}$$

Sulfate Stripping $$(NR_3H^+(HSO_4^-)) + Na_2CO_3 = Na_2SO_4 + CO_2(g) + (NR_3).$$

The stripped organic phase 66 may, if necessary (which may not be the case where there is sufficient acid in the feed solution to SX to protonate the amine prior to decavanadate loading), then be conditioned and recycled to the VSX process 56:

$$(NR_3) + H_2SO_4 = (NR_3H^+(HSO_4^-)).$$

In a precipitation step 66, ammonium metavanadate 68 may then be precipitated from the sodium vanadate solution, for example by addition of ammonium sulfate 70. In the event that there is an excess of iron in the strip solution, the strip solution may be heated and aged for a period of time for the iron to precipitate from solution. The precipitate may then be filtered, and the solution advanced to ammonium metavanadate precipitation:

$$5(NH_4)_2SO_4 + 2.5Na_4V_4O_{12} = 10NH_4VO_3 + 5Na_2SO_4.$$

The ammonium metavanadate (AMV) 68 may then optionally be filtered and washed to remove entrained impurities (including sodium) and then treated in a calcination process 72, to provide a calcined vanadium pentoxide product 74:

$$2NH_4VO_3 = V_2O_5 + 2NH_3(g) + H_2O(g).$$

EXAMPLES

Example 1: Beneficiation of Oxide Vanadium Bearing Ore

This Example demonstrates the effective beneficiation of vanadium and subsequent rejection of carbonate in an oxide ore.

Figure 3:
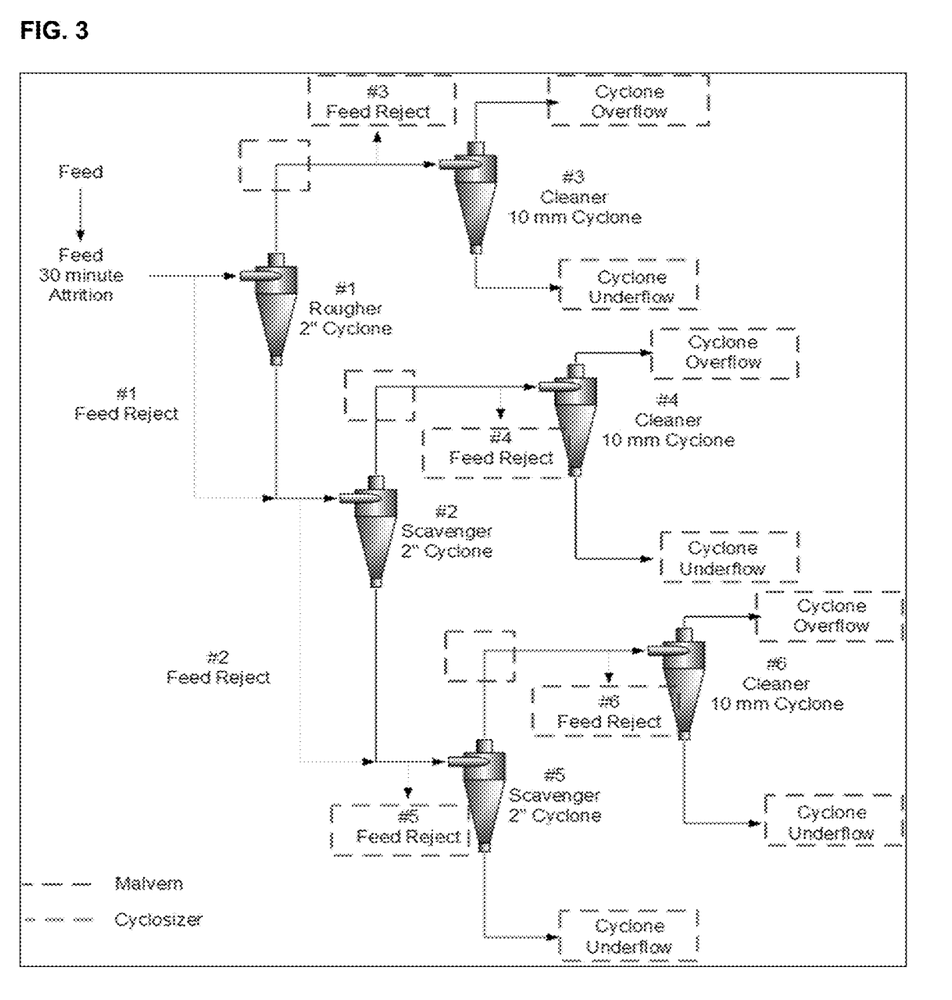
FIG. 3 is a schematic oxide hydrocyclone flow sheet.

In accordance with the oxide hydrocyclone flow sheet illustrated in FIG. 3, four 2-kilogram charges of oxide ore were pulped with water to 50% solids and scrubbed for 30 minutes in a 4-liter flotation machine equipped with an attrition scrubbing impeller. The scrubbed slurry from each feed charge was combined and diluted to 5% solids. The slurry was pumped through a 50.8 mm hydrocyclone (11 mm vortex finder and 6.4 mm apex) at a feed pressure of 28 psi (Cyc #1). The Cyc #1 underflow was pumped through the 50.8 mm hydrocyclone again for the second cycloning stage (Cyc #2). Similarly, the Cyc #2 underflow fed the fifth cycloning stage (Cyc #5). The Cyc #5 underflow was dried, filtered, weighed and a subsample was submitted for assays. The overflow from Cyc #1, Cyc #2, and Cyc #5 fed the third (Cyc #3), fourth (Cyc #4), and sixth (Cyc #6) cycloning stages, respectively. For each of the stages 3-6, the slurry was pumped through a 10 mm hydrocyclone at a feed pressure of 50 psi. The overflow and underflow products of each of these cycloning steps was dried, filtered, weighed and a subsample was submitted for assays.

The foregoing procedure yielded the results shown in Table 1, demonstrating successful beneficiation of vanadium and rejection of carbonate from the oxidized vanadium bearing ore.

TABLE 1

Oxide Ore Beneficiation Combined Products

| Product | Weight % | Assays, % V$_2$O$_5$ | Assays, % CO$_3$ | % Distribution V$_2$O$_5$ | % Distribution CO$_3$ |
|---|---|---|---|---|---|
| Cyc#3 O/F | 20.8 | 1.12 | 6.08 | 41.6 | 6.8 |
| Cyc#3 + 4 O/F | 28.7 | 1.11 | 6.19 | 57.1 | 9.5 |
| Cyc#3 + 4 + 6 O/F | 31.1 | 1.11 | 6.31 | 61.6 | 10.6 |
| Cyc#1 O/F | 32.8 | 0.99 | 8.29 | 57.7 | 14.6 |
| Cyc#1 U/F + Feed Rej | 67.2 | 0.35 | 23.6 | 42.3 | 85.4 |
| Cyc#2 O/F | 13.4 | 0.89 | 9.90 | 21.4 | 7.1 |
| Cyc#2 U/F + Feed Rej | 53.8 | 0.22 | 27.0 | 20.9 | 78.2 |
| Cyc#5 O/F | 6.4 | 0.61 | 16.2 | 7.0 | 5.6 |
| Combined Products ex. Cyc #5 U/F | 55.6 | 0.88 | 9.87 | 87.3 | 29.5 |
| Combined Products ex. Cyc #5 & 6 U/F | 52.4 | 0.91 | 9.19 | 85.4 | 25.9 |
| Combined Products ex. Cyc #4, 5 & 6 U/F | 48.0 | 0.94 | 8.64 | 80.7 | 22.3 |
| Combined Products ex. Cyc #2, 4, 5 & 6 U/F | 40.7 | 0.97 | 8.17 | 70.8 | 17.9 |

Example 2: Beneficiation of Reduced Vanadium Bearing Ore

This Example demonstrates the effective beneficiation of vanadium and rejection of carbonate in a reduced ore.

A 2-kilogram charge of reduced ore was pulped with water to 65% solids and ground in a rod mill for approximately 45 minutes. The ground slurry was placed in the attrition scrubbing tank for 30 minutes. The scrubbed material was diluted to 5% solids and pumped through a 10 mm hydrocyclone at a feed pressure of 50 psi. The cyclone overflow pulp was dried, filtered, weighed and a subsample was submitted for assays. The cyclone underflow was conditioned at high density and high intensity (1,800 rpm) with emulsified diesel (collector) and MIBC (frother) for 5 minutes in a 4-liter flotation cell. Following the conditioning stage, air was introduced to the flotation cell for a finite time, completing the first of six rougher flotation stages. Flotation time for each stage varied from 2-10 minutes increasing in time in the later stages. Additional doses of collector and frother were added during each stage. At the end of each stage, the flotation concentrate was filtered, dried, weighed and a subsample was submitted for assays. The tailings from each stage was used as feed for the next rougher flotation stage. The final rougher tailings were filtered, dried, weighed and a subsample was submitted for assays.

The foregoing procedure yielded the results shown in Table 2, demonstrating successful beneficiation of vanadium and rejection of carbonate from the reduced vanadium bearing ore.

TABLE 2

Reduced Ore Beneficiation Combined Products

| Product | Weight % | Assays, % V$_2$O$_5$ | Assays, % CO$_3$ | % Distribution V$_2$O$_5$ | % Distribution CO$_3$ |
|---|---|---|---|---|---|
| Cyclone O/F | 23.1 | 1.46 | 10.6 | 39.3 | 15.8 |
| Cyc O/F + Carbon Conc 1 | 39.3 | 1.32 | 8.41 | 60.6 | 21.4 |
| Cyc O/F + Carbon Conc 1-2 | 53.9 | 1.23 | 7.92 | 76.9 | 27.6 |
| Cyc O/F + Carbon Conc 1-3 | 72.0 | 1.10 | 7.96 | 92.5 | 37.1 |
| Cyc O/F + Carbon Conc 1-4 | 75.4 | 1.07 | 8.35 | 94.1 | 40.7 |
| Cyc O/F + Carbon Conc 1-5 | 77.1 | 1.06 | 8.62 | 95.0 | 43.0 |

TABLE 2-continued

Reduced Ore Beneficiation Combined Products

| Product | Weight % | Assays, % V$_2$O$_5$ | Assays, % CO$_3$ | % Distribution V$_2$O$_5$ | % Distribution CO$_3$ |
|---|---|---|---|---|---|
| Cyc O/F + Carbon Conc 1-6 | 78.3 | 1.05 | 8.87 | 95.5 | 44.9 |
| Carbon Tails | 21.7 | 0.18 | 39.3 | 4.5 | 55.1 |

Example 3: Pre-Leach Acidulation

This Example demonstrates, in two assays, the decomposition of carbonate minerals in an atmospheric pre-leach acidulation process.

In a first pre-leaching assay, a sample of vanadiferous ore was ground to 95% minus 105 micron particle size. A 423 g ore sample (dry basis) was placed in a stirred reactor with sufficient water to dilute to 15% solids. The slurry was heated to 75° C. and 96% H$_2$SO$_4$ acid added slowly to achieve ~30 g/L H$_2$SO$_4$ in solution. A total of 200.5 g of 96% H$_2$SO$_4$ was added for an addition rate of 200.5×0.96/423× 1000=455 kg H$_2$SO$_4$ per tonne of feed.

The results of this first pre-leach acidulation are shown in Table 3. The results show that the carbonate content of the ore sample was reduced from 16.2 to 0.09% indicating over 99% carbonate destruction. At the same time 36% of the vanadium, 47% of the uranium and 32% of the molybdenum were extracted into solution.

TABLE 3

Vanadiferous Ore Pre-Leach Acidulation

| Sample & Quant. (mL org) | Assay Units | Sample (ground to 95% passing 105 μm) 423 | Final Filtrate 2048 | Wash 3302 | Final Residue 374 | Leaching % |
|---|---|---|---|---|---|---|
| Al | mg/L, g/t | 29200 | 246 | 246 | 27000 | 12 |
| Ca | mg/L, g/t | 63400 | 574 | 881 | 56400 | 16 |
| Cd | mg/L, g/t | 46 | 4.59 | 0.54 | 21 | 59 |
| Cr | mg/L, g/t | 210 | 8.5 | 0.9 | 237 | 19 |
| Cu | mg/L, g/t | 152 | 2.6 | 0.5 | 158 | 11 |
| Fe | mg/L, g/t | 17000 | 379 | 379 | 15700 | 26 |
| Mg | mg/L, g/t | 34980 | 5450 | 574 | 2670 | 93 |
| Mo | mg/L, g/t | 166 | 7.4 | 0.8 | 103 | 32 |
| Ni | mg/L, g/t | 421 | 24.7 | 2.7 | 261 | 38 |
| P | mg/L, g/t | 4150 | 639 | 639 | 322 | 97 |
| Si | mg/L, g/t | 195000 | | | | — |
| Ti | mg/L, g/t | 1680 | 1.16 | 0.09 | 1740 | 0 |
| U | mg/L, g/t | 46 | 3.57 | 0.35 | 26 | 47 |
| V | mg/L, g/t | 4990 | 312 | | 3060 | 36 |
| Zn | mg/L, g/t | 4610 | 481 | 481 | 1690 | 80 |
| CO$_3$ | mg/L, % | 16.2 | | | 0.09 | 0 |

In a second pre-leaching assay, a sample of vanadiferous concentrate was prepared. A 750 g concentrate sample (dry basis) was placed in a stirred reactor with sufficient water to dilute to 15% solids. The slurry was heated to 75° C. and 96% H$_2$SO$_4$ acid added slowly to achieve ~30 g/L H$_2$SO$_4$ in solution. A total of 427.4 g of 96% H$_2$SO$_4$ was added for an addition rate of 427.4×0.96/750×1000=541 kg H$_2$SO$_4$ per tonne of feed.

The results of the acidulation are shown in Table 4. The results show that the carbonate content of the sample was reduced from 21.4 to 0.18% indicating over 99% carbonate destruction. At the same time 13% of the vanadium was extracted into solution.

TABLE 4

Vanadiferous Concentrate Pre-Leach Acidulation

| Sample & Quant. (mL org) | Assay Units | Concentrate 750 | Final Filtrate 3462 | Wash 5377 | Final Residue 717 | Leaching % |
|---|---|---|---|---|---|---|
| Al | mg/L, % | 2.36 | 180 | 25.7 | 2.25 | 4 |
| Ca | mg/L, % | 8.93 | 662 | 570 | 8.22 | 8 |
| Fe | mg/L, % | 1.37 | 667 | 91.6 | 0.97 | 29 |
| K | mg/L, % | 1.10 | 89 | 13 | 1.09 | 5 |
| Li | mg/L, % |  | <2 | <2 |  | — |
| Mg | mg/L, % | 3.69 | 6150 | 851 | 0.25 | 93 |
| Mo | mg/L, % |  | 4.5 | 0.7 |  | — |
| P | mg/L, % | 0.11 | 164 | 23 | 0.03 | 76 |
| Si | mg/L, % | 15.2 |  |  | 15.4 | 0 |
| Ti | mg/L, % | 0.14 | 1.12 | 0.13 | 0.14 | 0 |
| U | mg/L, % |  | <5 | <5 |  | — |
| V | mg/L, % | 0.49 | 112 | 15.7 | 0.44 | 13 |
| Zn | mg/L, % |  | 329 | 45.9 |  | — |
| CO3 | mg/L, % | 21.4 |  |  | 0.18 | — |

Example 4: Pressure Oxidation

This Example illustrates the thorough extraction of vanadium from a vanadiferous ore in a pressure oxidation process.

A sample of acidified (pre-leached) vanadiferous ore was treated by pressure oxidation. A 2 L volume Parr titanium autoclave was used for this demonstration. The autoclave conditions were 220° C., 3 hours, 100 psig oxygen over pressure and 1000 rpm stirring speed. A 377.6 g dry sample was pulped with water to 25% solids. Sulfuric acid (86.5 g at 96% purity) was added along with 6.3 g of lignsol solution and 20.9 g of ferric sulfate salt. The reactor was then sealed up and heated to the target temperature. Oxygen was then added. A small bleed stream of vent gas was removed from autoclave during the test in order to prevent buildup of inert gases such as carbon dioxide.

The results of the pressure oxidation are shown in Table 5. The results showed an extraction of 93% of the vanadium in the sample

TABLE 5

Pressure Oxidation for Vanadium Extraction from Ore

| Element Quant (mL/g) | Units | Residue Assay (mg/L, %, g/t) 378 | Final (180 min) Filtrate 531 | Wash 1060 | Final (180 min) Residue 299.7 | Extract. % |
|---|---|---|---|---|---|---|
| Al | mg/L, % | 2.94 | 5120 | 1550 | 2.2 | 40 |
| Ca | mg/L, % | 6.25 | 752 | 708 | 7.32 | 5 |
| Cr | mg/L, % | 0.02 | 32.4 | 10.6 | 0.01 | 49 |
| Cu | mg/L, % |  | 49.3 | 14.8 |  | — |
| Fe | mg/L, % | 1.56 | 4750 | 1410 | 2.05 | 40 |
| Mg | mg/L, % | 0.31 | 1250 | 377 | 0.06 | 86 |
| Mn | mg/L, % | 0.01 | 33.1 | 10.2 | <0.01 | 49 |
| Mo | mg/L, % |  | 28.9 | 8.8 |  | — |
| P | mg/L, % | 0.03 | 80 | 25 | 0.01 | 70 |
| Si | mg/L, % | 19.8 | 248 |  | 24.7 | 0 |
| Ti | mg/L, % | 0.18 | 7.54 | 2.36 | 0.23 | 1 |
| U | mg/L, % |  | 5 | 2 |  | — |
| V | mg/L, % | 0.33 | 1400 | 422 | 0.03 | 93 |
| Zn | mg/L, % |  | 912 | 278 |  | — |
| Fe(II) | mg/L, % |  | 226 |  |  | — |
| F | mg/L, % | 0.12 | 266 |  | 0.069 | 41 |

Example 5: Ion Exchange Extraction of Uranium and Molybdenum

This Example illustrates the effective removal of U and Mo from an acidic leach solution by ion exchange. An acidic leach solution was prepared by pressure oxidation of a vanadiferous ore, as described in Example 4. The leach solution was at a reduced oxidation reduction potential (ORP) sufficient for the vanadium oxidation state to be controlled to +4. A strong base ion exchange resin (Purolite A660) was conditioned with 150 g/L $H_2SO_4$ solution at room temperature to convert the resin to the sulfate form. The acid conditioned resin was washed with water to remove excess acid from the resin before removing uranium and molybdenum.

A volume of 100 mL of wet-settled resin was placed in a 2.54 cm column. The leach solution was passed downflow through the column of resin and the treated solution recovered and analyzed. Table 6 shows the composition of the solution over the course of the test, illustrating that U and Mo were removed from solution by the resin while the vanadium in solution was not loaded.

TABLE 6

Removal of U and Mo by Ion Exchange

|  |  | Feed Solution | Sample 1 Solution | Sample 2 Solution | Sample 3 Solution |
|---|---|---|---|---|---|
| Volume | mL |  | 3327 | 3255 | 3640 |
| BV (Total) |  |  | 33 | 66 | 102 |
| Element | Units | Assay (mg/L) | | | |
| V | mg/L, g/t | 1600 | 1560 | 1630 | 1650 |
| U | mg/L, g/t | 14 | 0.76 | 4.44 | 7.44 |
| Mo | mg/L, g/t | 32.6 | 3.2 | 9.5 | 14 |

Example 6: Solvent Extraction of Vanadium

This Example illustrates the efficacy of solvent extraction of dissolved vanadium using the tertiary amine Alamine 336.

Tertiary amines soluble in a hydrocarbon diluent can be protonated to form a large organic cation in the organic phase. This large organic cation can then ion pair with metal anions in an aqueous phase to form organic soluble cation anion complexes thereby moving the metal containing ion from the aqueous phase into the organic phase. By vigorously mixing the respective tertiary amine containing organic phase with the respective metal anion containing aqueous phase over a range of organic to aqueous volumes ratios, then allowing the phases to separate and analyzing the resulting organic and aqueous phases for the metal of interest one can generate data for an extraction isotherm that is a function of the conditions under which the data was generated, which will be unique and representative of results under those conditions. With the extraction isotherm, it is possible to computationally model extractions, including modeling an advancing organic phase flow, an advancing aqueous phase flow and the extraction stage efficiencies, reflected in a McCabe Thiele diagram that allows the prediction of the degree of recovery of the metal of interest under the conditions used to generate the isotherm, for example with one, two or more counter current stages of extraction.

Vanadium in the plus 5 oxidation state will form vanadium-oxygen complex anions over a wide pH range, and these vanadium-oxygen complex anions can be extracted by tertiary amines. To model this behaviour in the context of the present processes, isotherm data was generated using an organic solution that contained 1 Volume % of Alamine 336 (a tertiary amine available from BASF) in the hydrocarbon diluent Aromatic 150 ND. The organic solution was vigorously contacted twice with a fresh 1.5 g/L sulfuric acid solution to give a fully protonate Alamine 336 solution. Fresh fully protonated Alamine 336 organic solution was then vigorously contacted over a range of organic to aqueous volumes with fresh aqueous solution containing 1.65 g/L V in the +5 oxidation state, about 5 g/L ferric iron and other metals, including trace amounts of molybdenum. Contact was for 10 minutes total to assure equilibrium and the temperature was 45° C. An equilibrium pH of 1.5 for the aqueous phase was targeted. Mixing was stopped late in the total mixing time with the aqueous phase showing a pH of 1.35 to 1.4 and a small amount of NaOH was added and stirring again started to raise the pH to 1.5. This was repeated again to get a final pH of 1.5. After the phases were allowed to separate a final time the pH of each aqueous phase was determined. Then filtered samples of the respective organic and aqueous phases were subjected to vanadium analysis to give the isotherm data in Table 7.

TABLE 7

Isotherm Points for Vanadium Extraction

| O/A Ratio | Equilibrium pH | Aqueous phase mg/L Vanadium | Organic Phase mg/L Vanadium |
|---|---|---|---|
| 10/1 | 1.50 | 262 | 143 |
| 7/1 | 1.50 | 303 | 194 |
| 5/1 |  | 330 | 266 |
| 3/1 | 1.57 | 266 | 477 |
| 1/1 | 1.59 | 361 | 1323 |
| 1/3 | 1.52 | 783 | 2731 |
| 1/5 | 1.51 | 1240 | 3164 |
| 1/10 | 1.57 | 1380 | 3000 |

Figure 4:
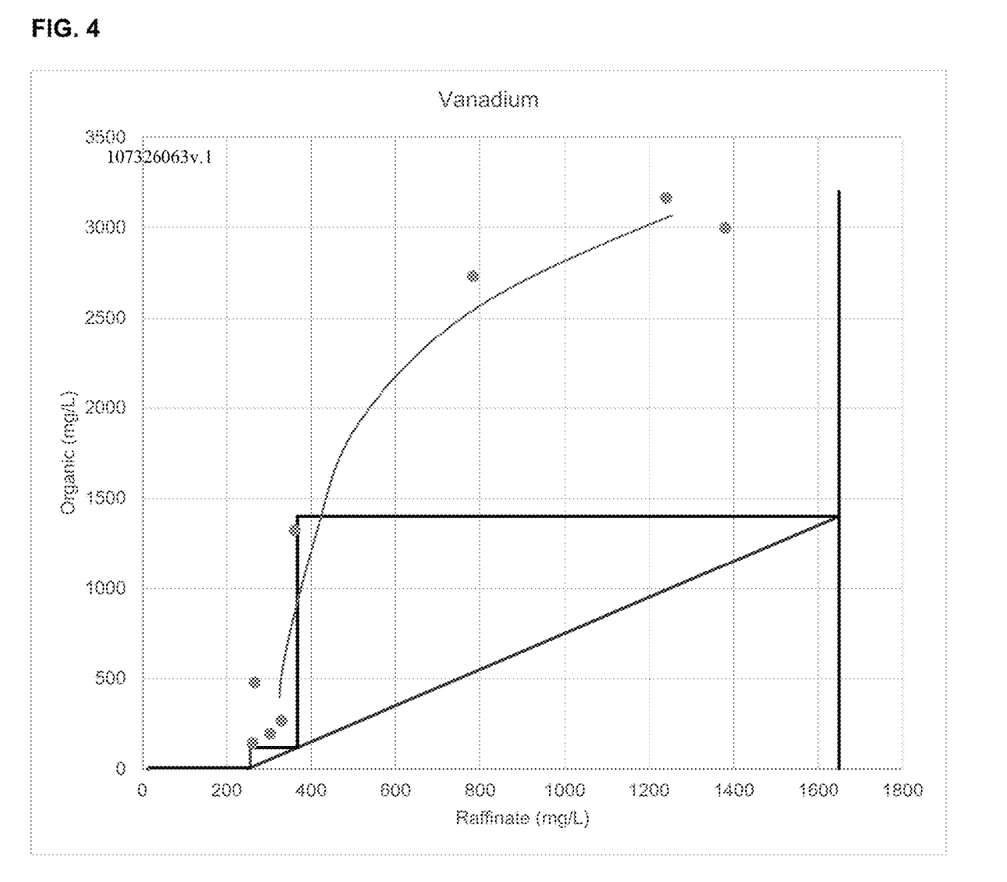
FIG. 4 is a graph illustrating an extraction isotherm and McCabe Thiele Diagram for vanadium recovery.

The isotherm data was used to generate a McCabe Thiele diagram, assuming an advance organic to advance aqueous flow of 1/1, with 100% stage efficiency. The extraction isotherm along with the McCabe Thiele diagram for vanadium recovery for two counter current stages of extraction is shown in FIG. 4. The McCabe Thiele diagram illustrates that approximately 84% vanadium recovery from an aqueous solution having 1.65 g/L vanadium at a pH of 1.5 when using a 1 volume % solution of Alamine 336 in an aromatic diluent at 45° C. in a solvent extraction plant with two counter current extraction stages.

Example 7: Vanadium Stripping

This Example illustrates the effective stripping of vanadium from an Alamine 336 solvent. This was illustrated using 8 liters of a 1 volume % solution of Alamine 336 in Aromatic 150 ND, which was vigorously contacted twice with a fresh 1.5 g/L sulfuric acid solution for at least 2 minutes. This protonated 1 volume % Alamine 336 solution was next vigorously contacted for 10 minutes with an aqueous vanadium leach solution which was generated by pressure leaching a vanadium oxide ore, as described herein, and then using hydrogen peroxide to oxidize all the vanadium to the +5 oxidation state. The resulting vanadium loaded organic phase contained 960 mg/L V, with iron and molybdenum as impurities. This vanadium loaded organic solution was batch stripped with 200 ml of a solution containing 100 g/L of sodium carbonate at an organic/aqueous ratio of 1. After each contact of the strip solution with the fresh vanadium loaded organic phase, the pH of the recovered vanadium strip solution was raised from about 9 back to pH 11 with the addition of sodium carbonate.

The vanadium concentration of the stripped organic was less than 1 mg/L indicating essentially complete stripping of the vanadium using sodium carbonate at a pH about 9 or greater. The final volume of the initial strip solution was 214 ml, and before crystallization or precipitation it contained 34.6 g/L V, ~1.7 g/L Fe, 110 g/L sodium and 102 mg/L molybdenum and it had a pH>9.

Example 8: Crystallization of Ammonium Metavanadate

This Example illustrates the effective crystallization of ammonium metavanadate (AMV) from a strip liquor prepared as described in Example 7. After sitting, the strip liquor produced in Example 7 showed signs of spontaneous crystallization and precipitation. The crystals and solids were filtered from the strip liquor and then washed with deionized water. The crystals dissolved in the wash water for the most part, leaving behind on the filter paper a small amount of red/brown precipitate. The resulting solids/crystal wash water was analyzed, with the result that it was found to contain 8.2 g/L vanadium, 325 mg/L Fe, 29.9 g/L sodium and 25.6 mg/L molybdenum—indicating that some of the stripped vanadium crystallized over time and was dissolved in the wash water.

The filtered strip liquor contained 33.3 g/L V, 1.65 g/L Fe, 89.4 g/L sodium and 97 mg/L molybdenum, and it had a pH of 10.1. This solution was subjected to iron removal by heating the solution to 95° C. for 7 hours to yield a solution containing 36.4 g/L, 117 g/L Na and 992 mg/L Fe, pH=9.92. The pH of this solution was adjusted to 10.5 with NaOH and then brought back to ~95-100° C. for about 6 hours. During heating the liquor eventually turned partially cloudy, and upon filtration to produce clear vanadium containing strip solution, a small amount of red solids were left on the filter paper. The final clear vanadium de-ironed strip solution contained 42.3 g/L V, 142 g/L Na and 126 mg/L Fe and showed a loss of volume due to evaporation.

Ammonium vanadate was precipitated from a 79 ml sample of the final clear de-ironed solution above as follows. The 79 ml sample was stirred at 35° C. and then a 6-fold excess of ammonium sulfate on a mole basis was added slowly over about a 3-hour period while maintaining a pH of 8 by addition of sulfuric acid. The resulting solution was stirred and cooled overnight at room temperature.

The crystals formed in the reaction vessel were then filtered to produce 15.4 grams of AMV. The filtrate solution contained 872 mg/L of vanadium.

Example 9: Calcination of AMV

The 15.4 g of AMV produced in Example 9 were calcined at 500° C. for 3 hours, resulting in 12.2 g of calcine (21% weight loss). The initial calcined product was high in Na and the following wash sequence was used to reduce the Na content. The calcine was re-pulped with 200 ml of hot deionized water for 30 minutes at temperature and then filtered. It was then re-pulped with deionized water at pH by addition of sulfuric acid, mixed well for 30 minutes and then filtered. A final displacement wash was done on the filter cake using deionized water.

The thrice washed calcine showed 49.7% V, 1.82% Na, 0.09% Fe and 0.02% Al as the major constituents. Direct conversion of the V to $V_2O_5$ suggests 88.7% $V_2O_5$, while a 100% minus impurities analysis suggests 97-98% $V_2O_5$.

The washes removed about 92% of the Na in the original calcine and around a third of the Fe, the bulk of which was handled in the first hot water wash. The next two washes acted as polishing steps.

An alternative to washing the calcine would be to wash the AMV with a solution of about 450 g/L ammonium sulfate in deionized water several times prior to calcination. High purity AMV may in turn be produced by recrystallization.

INCORPORATED REFERENCES

Gupta and Krishnamurthy (1992), Extractive Metallurgy of Vanadium, Process Metallurgy 8, Elsevier Science Publishers B.V.

Brooks and Potter, "Recovering vanadium from dolomitic Nevada shale" 1974, U.S. Bureau of Mines.

Citation of references herein is not an admission that such references are prior art to the present invention. Any priority document(s) and all publications, including but not limited to patents and patent applications, cited in this specification, and all documents cited in such documents and publications, are hereby incorporated herein by reference as if each individual publication were specifically and individually indicated to be incorporated by reference herein and as though fully set forth herein. Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Terms such as "exemplary" or "exemplified" are used herein to mean "serving as an example, instance, or illustration." Any implementation described herein as "exemplary" or "exemplified" is accordingly not to be construed as necessarily preferred or advantageous over other implementations, all such implementations being independent embodiments. Unless otherwise stated, numeric ranges are inclusive of the numbers defining the range, and numbers are necessarily approximations to the given decimal. The word "comprising" is used herein as an open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing. The invention includes all embodiments and variations substantially as hereinbefore described and with reference to the examples and drawings.

The invention claimed is:

1. A method of recovering vanadium values from a shale deposit, comprising:
   recovering an oxidized material from the shale deposit, the oxidized material comprising carbonate gangue, vanadiferous mineralization and oxidized vanadate-containing kerogen, wherein the oxidized material comprises:
   ≤1 wt % organic carbon,
   ≤2 wt % vanadium pentoxide, as an original oxidized vanadium fraction, and
   ≥10 wt % calcium and magnesium carbonates, as an original oxidized carbonates fraction;
   recovering a carbonaceous material from the shale deposit comprising carbonate gangue and a vanadium-containing kerogen, wherein the carbonaceous material comprises:
   ≥4 wt % organic carbon,
   ≤2 wt % vanadium pentoxide, as an original carbonaceous vanadium fraction, and
   ≥10 wt % calcium and magnesium carbonates, as an original carbonaceous carbonates fraction;
   subjecting the oxidized material to an attrition step and to a particle size separation step so as to segregate a vanadium fines stream from a coarser carbonates stream, wherein the vanadium fines stream comprises less than about 30% wt % of the original oxidized carbonates fraction and at least 75% wt % of the original oxidized vanadium fraction reports to the vanadium fines stream;
   subjecting the carbonaceous material to a de-sliming step so as to segregate a fine vanadium and carbonate-containing fraction from a coarser vanadium and carbonate-containing fraction; and, subjecting the coarser vanadium-containing fraction to flotation so as to segregate a vanadium froth concentrate from a carbonate flotation tail, wherein the vanadium froth concentrate comprises less than about 30 wt % of the original carbonaceous carbonates fraction and at least 75 wt % of the original carbonaceous vanadium fraction reports to the combination of the vanadium froth concentrate and the fine vanadium and carbonate-containing fraction;
   combining the vanadium froth concentrate, the fine vanadium and carbonate-containing fraction and the vanadium fines to provide a vanadium concentrate having a vanadium concentration of at least 1 wt %;
   subjecting the vanadium concentrate to an atmospheric pre-leach (PL) with the addition of an autoclave-sourced sulfuric acid, to produce a pre-leached product stream, so as to:
      decompose residual carbonate minerals in the vanadium concentrate to produce carbon dioxide off-gas; and,
      precipitate iron species from the vanadium concentrate;
   subjecting the pre-leached product to a PL solid liquid separation to separate a PL solid stream from a vanadium recovery solution;
   directing the PL solid stream to a pressure oxidation (POX) in the presence of a POX leaching acid and a POX oxidizing agent, to produce a POX product stream by leaching vanadium into a POX solution comprising the autoclave-sourced sulfuric acid;
   subjecting the POX product stream to a POX solid liquid separation to separate a solid POX residue from the POX solution;
   directing the POX solution to the atmospheric PL, to provide the autoclave-sourced sulfuric acid to the atmospheric PL;
   subjecting the vanadium recovery solution to a vanadium oxidation step to convert dissolved vanadium species to dissolved vanadium(v) oxoanion species in an oxidized vanadium recovery solution;
   subjecting the oxidized vanadium recovery solution to a vanadium solvent extraction (VSX) step to load vanadium species into a pregnant organic phase, and separating the pregnant organic phase from a spent vanadium recovery solution;

stripping vanadium from the pregnant organic phase into an aqueous sodium or ammonium vanadate solution, to provide a stripped organic phase that is recycled to the VSX step; and, precipitating ammonium metavanadate from the sodium or ammonium vanadate solution by addition of ammonium sulfate.

2. The method of claim 1, wherein the ammonium metavanadate is calcined to provide a vanadium pentoxide product.

3. The method of claim 1, wherein the shale deposit is a dolomitic shale deposit.

4. The method of claim 1, wherein the original oxidized carbonates fraction makes up ≥20 wt % or ≥25 wt % of the oxidized material.

5. The method of claim 1, wherein the original carbonaceous carbonates fraction makes up ≥20 wt % or ≥25 wt % of the carbonaceous material.

6. The method of claim 1, wherein the oxidized material and/or the carbonaceous material comprises 0.2 to 1.5 wt % vanadium pentoxide.

7. The method of claim 1, wherein the oxidized material and/or the carbonaceous material comprises one or more of: hydrated calcium vanadate (as hewettite or metahewettite), corvusite, montroseite-goethite and/or pascoite.

8. The method of claim 1, wherein the vanadiferous mineralization in the oxidized material comprises goethite.

9. The method of claim 1, wherein the oxidized material and/or the carbonaceous material comprises: 6 to 16 wt % CaO; and/or, 4 to 10 wt % MgO.

10. The method of claim 1, wherein at least 90 wt % of the vanadium pentoxide in the oxidized material reports to the vanadium fines stream.

11. The method of claim 1, wherein at least 90 wt % of the vanadium pentoxide in the carbonaceous material reports to the vanadium froth concentrate.

12. A method of producing a vanadium concentrate from a shale deposit, comprising:

recovering an oxidized material from the shale deposit, the oxidized material comprising carbonate gangue, vanadiferous mineralization and oxidized vanadate-containing kerogen, wherein the oxidized material comprises:
≤1 wt % organic carbon,
≤2 wt % vanadium pentoxide, as an original oxidized vanadium fraction, and
≥10 wt % calcium and magnesium carbonates, as an original oxidized carbonates fraction;

recovering a carbonaceous material from the shale deposit comprising carbonate gangue and a vanadium-containing kerogen, wherein the carbonaceous material comprises:
≥4 wt % organic carbon,
≤2 wt % vanadium pentoxide, as an original carbonaceous vanadium fraction, and
≥10 wt % calcium and magnesium carbonates, as an original carbonaceous carbonates fraction;

subjecting the oxidized material to an attrition step and to a particle size separation step so as to segregate a vanadium fines stream from a coarser carbonates stream, wherein the vanadium fines stream comprises less than about 30% wt % of the original oxidized carbonates fraction and at least 75% wt % of the original oxidized vanadium fraction reports to the vanadium fines stream;

subjecting the carbonaceous material to a de-sliming step so as to segregate a fine vanadium and carbonate-containing fraction from a coarser vanadium and carbonate-containing fraction; and, subjecting the coarser vanadium-containing fraction to flotation so as to segregate a vanadium froth concentrate from a carbonate flotation tail, wherein the vanadium froth concentrate comprises less than about 30 wt % of the original carbonaceous carbonates fraction and at least 75 wt % of the original carbonaceous vanadium fraction reports to the combination of the vanadium froth concentrate and the fine vanadium and carbonate-containing fraction; and, combining the vanadium froth concentrate, the fine vanadium and carbonate-containing fraction and the vanadium fines to provide a vanadium concentrate having a vanadium concentration of at least 1 wt %.

13. The method of claim 12, wherein the shale deposit is a dolomitic shale deposit.

14. The method of claim 12, wherein the original oxidized carbonates fraction makes up ≥20 wt % or ≥25 wt % of the oxidized material.

15. The method of claim 12, wherein the original carbonaceous carbonates fraction makes up ≥20 wt % or ≥25 wt % of the carbonaceous material.

16. The method of claim 12, wherein the oxidized material and/or the carbonaceous material comprises 0.2 to 1.5 wt % vanadium pentoxide.

17. The method of claim 12, wherein the oxidized material and/or the carbonaceous material comprises one or more of: hydrated calcium vanadate (as hewettite or metahewettite), corvusite, montroseite-goethite and/or pascoite.

18. The method of claim 12, wherein the vanadiferous mineralization in the oxidized material comprises goethite.

19. The method of claim 12, wherein the oxidized material and/or the carbonaceous material comprises: 6 to 16 wt % CaO; and/or, 4 to 10 wt % MgO.

20. The method of claim 12, wherein at least 90 wt % of the vanadium pentoxide in the oxidized material reports to the vanadium fines stream.

21. The method of claim 12, wherein at least 90 wt % of the vanadium pentoxide in the carbonaceous material reports to the vanadium froth concentrate.

* * * * *